C. W. DUNHAM.

TRACK INSTRUMENT.

APPLICATION FILED AUG. 31, 1918.

Reissued Oct. 8, 1918. 14,533.

WITNESSES

A. Herman Wegner.

E. R. Crum

INVENTOR

Charles W. Dunham, by A. L. Kenyon

His Attorney.

THE NORRIS PETERS CO., PHOTO-LITHO., WASHINGTON, D. C.

UNITED STATES PATENT OFFICE.

CHARLES W. DUNHAM, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

TRACK INSTRUMENT.

Specification of Reissued Letters Patent. Reissued Oct. 8, 1918.

14,533.

Original No. 1,273,835, dated July 30, 1918, Serial No. 136,952, filed December 14, 1916. Application for reissue filed August 31, 1918. Serial No. 252,267.

*To all whom it may concern:*

Be it known that I, CHARLES W. DUNHAM, a citizen of the United States, residing at Edgewood borough, in the county of Allegheny and State of Pennsylvania, have invented certain new and useful Improvements in Track Instruments, of which the following is a specification.

This invention relates to track instruments, and has for its primary object the provision of a reliable and efficient instrument adapted to be operated by the vertical motion of a rail or track when a car or train is passing thereover.

Another object of this invention is the provision of a track instrument which is self-alining with respect to a track to insure the proper operation thereof irrespective of the position of the track.

Other objects of the invention will appear from a consideration of the following detailed description taken in connection with the accompanying drawings forming a part of this specification, with the understanding, however, that the embodiment illustrated, though practical, is by no means the only embodiment which the invention may assume, wherefore the invention is not confined to any strict conformity with the showing of the drawings, but may be changed and modified in various particulars, within the scope of the appended claims.

In the drawings, Figure 1 is a view showing, in side elevation, partly sectioned, one form of track instrument embodying my invention.

Figure 4:
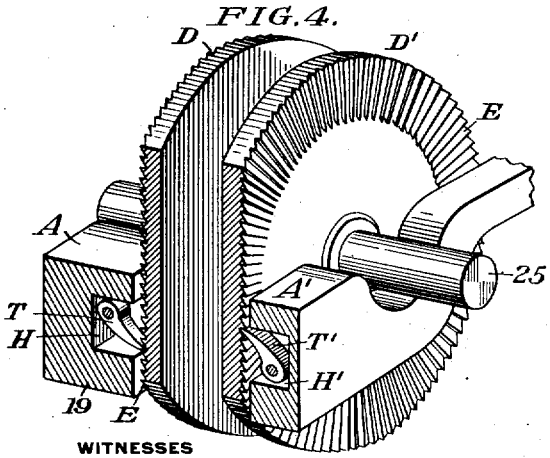
Fig. 4 is a sectional perspective view taken on the line IV—IV of Fig. 1 and looking in the direction of the arrows.

In all of the views, except Fig. 4, the casing for the instrument is shown in section.

Similar reference characters designate similar parts throughout the several views.

Figure 2:
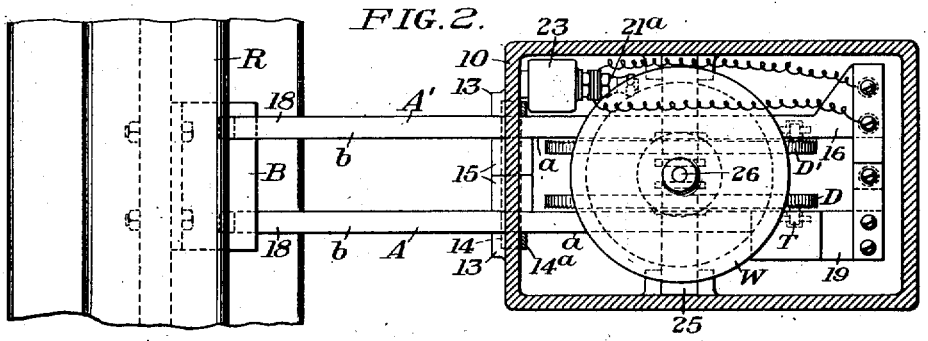
Fig. 2 is a top plan view of the instrument and rail shown in Fig. 1.
Figure 1:
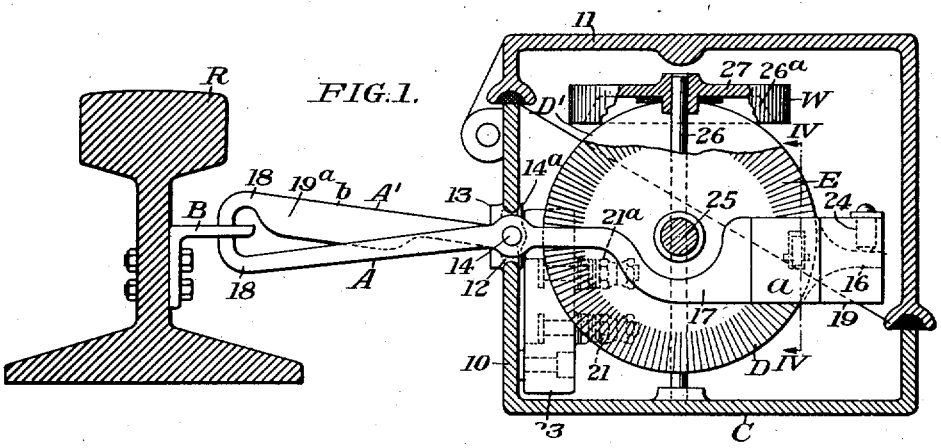

Referring to the drawings in detail, the instrument is shown in this instance partially inclosed in a rectangular casing C formed of suitable material by means of which the instrument is protected against the elements. The casing is preferably formed of two separable hinged sections 10 and 11, each of which is substantially triangular in cross-section for a purpose which will become apparent hereinafter. The section 10 has its front side wall provided with a horizontal slot 12 at the ends of which are outwardly projecting lugs 13. These lugs cover the ends of the slot and are concaved on their inner surfaces to form bearings for a pintle 14. The pintle is retained in these bearings by means of bearing plates 14ª which may be attached to the inner wall of the box by suitable means not shown in the drawing. Fulcrumed on the pintle 14 are two operating arms A and A′, the arms having their confronting sides formed with sleeve bearings 15 which receive the pintle 14 and which coöperate with the lugs 13 to provide means for retaining the operating arms in their proper positions at all times. The arms A and A′ are pivoted upon the pintle 14 at their medial portions, each of the arms having a portion *a* disposed within the casing C and a portion *b* arranged exteriorly of the casing. The portion *a* of each arm is provided with a downwardly curved intermediate portion as shown at 17 in Fig. 1. The portions *b* of the arms A and A′ are inclined downwardly and upwardly, respectively from their pivoted ends toward their free ends, the free ends of the portions terminating in inwardly bent hooks 18. The arm A is biased to move in a clockwise direction while the arm A′ is biased in a counter-clockwise direction, I having obtained this biasing action, in this instance, by means of weights, the portion *a* of arm A being enlarged to form a weight 19, while portion *b* of arm A′ is formed with a widened portion adjacent its hook 18 which constitutes a weight 19ª.

Figure 3:
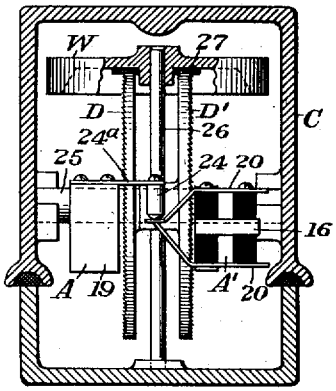
Fig. 3 is an end view, partly in section, of the instrument shown in Fig. 1.

Mounted on the enlarged end 16 of arm A′ are two contact fingers 20, 20, one being on top and one on the bottom of the arm, as shown in Fig. 3. These fingers are electrically connected respectively with terminal post 21 and 21ª arranged upon an insulating block 23 secured to the inner side of the casing C. The fingers 20, 20 are formed of resilient material and normally tend to separate, but are maintained in closed position by means of an insulated stud 24 attached to a plate 24ᵃ which is mounted on the upper side of the arm A. When the arms A, A′ occupy their normal relative positions, which are the positions wherein they are shown in the drawing, the stud 24 operates to close contact 20—20, but when either arm is swung in opposition to its biasing force the stud permits this contact to open.

Although I have described a specific manner of controlling a circuit by means of the arms, I wish it to be clearly understood that any means may be used without departing from the spirit of the invention.

As here shown, the instrument is arranged in the track ballast on the outer side of a track rail R, the arms A and A′ being positioned transversely with respect to the rail and of sufficient length to prevent the instrument from interfering with passing trains.

The hooked ends 18 of arms A, A′ coact with an angle bar B secured to the web portion of the rail R. The hooks 18 are adapted to engage the angle bar upon opposite sides thereof under the biasing action of the weights 19 and 19ᵃ, whereby the movements of the arms A and A′ are controlled by the rail R. When the rail is at rest, the arms are maintained in their normal positions, thus causing the contact fingers 20, 20 to be closed, as has been described. However, when the rail is moved vertically, say in upward direction, by the passing of a train thereover, arm A′ is swung in clockwise direction against the action of the weight 19ᵃ. Meanwhile, arm A is permitted to swing also in clockwise direction under the biasing action of the weight 19, but this movement is relatively slow compared to the movement of arm A′ owing to the time required to overcome the inertia of the arm A when the rail is suddenly moved upwardly and for a further reason explained hereinafter. It will therefore be seen that since arms A and A′ are spread apart, the stud 24 will disengage the fingers 20, 20 to permit the opening of the latter. It is to be understood, that should the rail move downwardly, a reverse action will occur from that just described, which will result in the counter clockwise movements of arms A and A′, arm A moving in advance of arm A′, whereby the stud 24 will disengage the fingers as in the first operation. Consequently, the instrument is responsive for contact operation to both upward or downward movement of the rail. Upon the returning of the rail to its normal position, after a train has passed, the arms will be caused to return to their normal positions under the action of the weights 19 and 19ᵃ, as will be understood. In the event the rail does not return to the exact position occupied previous to the passing of a train, it will be evident that the arms will automatically assume their normal relative positions irrespective of the position of the rail so that contact 20—20 will be closed.

It is desirable, however, to retard the return movement of the arms so as to maintain the contact fingers in open position for an extended period of time to effectively actuate devices, such as signals or the like. In this embodiment of my invention, I have provided means for accomplishing this function, which means comprises a pair of spaced disks D and D′ interposed between the arms A and A′ and mounted to rotate on a rod 25. This rod 25 is arranged transversely within the casing C, and owing to the curved portions 17 of arms A and A′ it does not interfere with separation of these arms to open the contact 20—20. Intersecting the rod 25 at right angles and extending through the same is another rod 26 upon the upper end of which is journaled a wheel W. This wheel W is arranged above the disks D and D′ and its under surface is provided with a flat ring 27 formed of frictional material of such width as to engage the peripheries of the disks D and D′. Wheel 27 is free to slide vertically on rod 26, and so rests on disks D, D′ because of its own weight, whereby motion is transmitted from disk to disk through the wheel W but in opposite directions. The weight of wheel W, and consequently its inertia, may be increased by means of a heavy flange 26ᵃ, as shown. The outer sides of the disks D and D′ are formed with teeth E and E′, respectively, the teeth E being reversely disposed with relation to the teeth E′. Pivotedly mounted within recesses H, H′, formed in the confronting sides of the arms A and A′ are pawls T and T′, respectively, which are reversely disposed so as to engage with the teeth E and E′, respectively. The teeth of disk D and pawl T of arm A are so arranged as to permit free movement of the arm A irrespective of its disk when the portion *a* of that arm is moving upwardly but to automatically lock the arm with the corresponding disk when moving downwardly. The teeth E′ and pawl T′ being arranged just the reverse, it is apparent that arm A′ will only be locked to its disk D′ when the portion *a* thereof is moved upwardly.

In operation, when the rail R is moved vertically, say, in an upward direction, arm A′ is rocked upon its pivot in clockwise direction to cause its portion *a* to move downwardly and freely over the toothed surface of the adjacent disk D′. Arm A, however, does not immediately follow the movement of the rail, but is retarded by virtue of the fact that it must turn the disks D and D′ and the wheel W. Consequently, the portions *a* of arms A and A′ are now separated, so that stud 24 permits contact fingers 20, 20 to open. These relative positions of the arms A and A′, however, are not permanent, that is, assuming the rail R is maintained in an elevated position by the presence of a train adjacent thereto, the disk D being movable, the arm A when locked thereto will rotate the disk and consequently the wheel W and disk D′ under the action of weight 19, thereby permitting this arm to move to alined or normal position with relation to arm A′ to cause the closing of the fingers 20, 20, as has been described. This movement, however, is relatively slow as it is necessary that the biasing action of the weight overcome the resistance offered by the rotation of the disk and wheel, thereby causing retarded movement of the arm A to the alined position to delay the closing of the circuit. When the rail returns to its normal position, after the same has been relieved of its load, arm A will immediately be returned to normal position, but the return of arm A′ will be delayed, so that contact 20, 20 will again be opened and thereafter will become closed. Obviously, if the rail R is depressed, by the presence of a train directly thereon, a reverse operation will occur to cause a separation of the portions *a* of arms A and A′ to separate the contact fingers, the return movement of arm A, when the rail assumes its normal position, being retarded by the disks and wheel.

By means of a track instrument of this construction, it will be seen that when a track equipped with such instrument is traversed by a train, the vertical motion of the track will cause a separation of the arms A and A′ to effectively disrupt the circuit, and that such separation of the arms will be maintained during the time of passage of the train, although it is understood that the track may return to its normal position between the trucks of each car and between cars. Such return movement of the track, however, will not permit or cause a return of the arms to their normal relative positions, as the disks and wheel prevent such action as has been described. It will thus be seen that my track instrument is effectively operated by the vertical motion of a track to properly perform the function for which it is intended.

From the foregoing description, taken in conjunction with the accompanying drawings, it is apparent that I have provided a track instrument responsive for contact operation to vertical movement of the rail and that such operation in one direction is automatically delayed. Furthermore, it will be noted that the track instrument is so connected to a rail as to allow for lateral and vertical displacement of the rail without affecting, in any manner, the operation of the instrument.

Having thus described my invention, what I claim is:

1. In a track instrument, two fulcrumed members arranged adjacent a track and biased to engaging position therewith to cause movement of one of the members when the track is depressed and of the other member when the track is raised by the passing of a train, means for controlling the return movement of each of said members independently of said track, and a contact controlled by said members.

2. In combination with a track, an instrument comprising pivoted arms biased toward each other and to engaging position with said track to cause movement of both of said arms independently of each other when said track is raised or depressed, means for simultaneously controlling the movement of said arms independently of said track when the latter is returning to its normal position, and a contact controlled by said arms.

3. A track instrument comprising two members mounted for relative movements and biased in opposite directions, one of said members being movable against its biasing force by upward movement of a rail and the other member being movable against its biasing force by downward movement of the rail, means for retarding the return of each member in response to its biasing force, and a contact controlled by relative movements of said members.

4. A track instrument comprising a pair of pivoted arms connected to a track for independent movements in opposite directions when said track is raised and depressed, means for delaying the movement of said arms when the track is returning to its normal position, and a contact controlled by said arms.

5. A track instrument comprising a support mounted independently of the track rails, two members pivotally mounted in said support and biased to swing in opposite directions, one of said members being swung in opposition to its bias by upward movement of a track rail and the other member being swung in opposition to its bias by downward movement of the track rail, and a contact controlled by relative movements of said members.

6. A track instrument comprising a support mounted independently of the track rails, two members pivotally mounted in said support and biased to swing in opposite directions, one of said members being swung in opposition to its bias by upward movement of a track rail and the other member being swung in opposition to its bias by downward movement of the track rails, means for retarding the return movement of each member in response to its biasing force, and a contact controlled by relative movements of said members.

7. A track instrument comprising pivoted members biased to a track to move in opposite directions, when said track is moved vertically, rotatable elements interposed between said members, ratchets carried by each of the members and engageable with said elements, means connecting said elements for synchronizing the movements of said elements, and a contact controlled by said arms.

8. A track instrument comprising two members mounted for relative movements and biased in opposite directions, one of said members being movable against its biasing force by upward movement of a rail and the other member being movable against its biasing force by downward movement of the rail, two rotatable disks one for each member, means for clutching each member to the corresponding disk to cause rotation of the disk during movement of the member in response to its biasing force but for permitting movement of the member in the other direction without causing rotation of the disk, means for impeding the rotation of each disk, and a contact controlled by relative movements of said members.

9. In combination with a track, an instrument comprising movable arms biased to given relative positions, means connecting said arms and track for moving said arms away from said biased position when said track is moved vertically, means for controlling the return movement of either of the arms independently of the track depending upon which direction the track is moved, and a contact controlled by said arms.

10. A track instrument comprising a support mounted independently of the track rails, two members pivotally mounted in said support and biased to swing in opposite directions, said members being held in normal relative positions by a track rail and swung in opposite directions in opposition to their biasing forces by vertical movements of said rail, and a contact controlled by said members and arranged to assume one functional condition or another according as said members do or do not occupy their normal relative positions.

11. A track instrument comprising two movable members biased in opposite directions and held in normal relative positions by a track rail when the rail is at rest, each member being movable in opposition to its bias by movement of the track rail, means for retarding the movement of each member in response to its bias, and a contact controlled jointly by said members and arranged to assume one condition or another according as said members do or do not occupy their said normal relative positions.

12. A track instrument comprising two movable members biased in opposite directions each of which is moved in opposition to its bias by a track rail, means for retarding the movement of each member in response to its bias, and a contact controlled jointly by said members.

13. A track instrument comprising two movable members biased in opposite directions and each moved in opposition to its bias by a track rail, two rotatable disks one for each member, means interposed between each member and the corresponding disk for rotating the disk when the member moves in response to its bias but not when the member moves in the other direction, means for retarding the rotation of said disks, and a contact controlled jointly by said members.

14. A track instrument comprising two movable members biased in opposite directions and each moved in opposition to its bias by a track rail, two rotatable disks one for each member, means interposed between each member and the corresponding disk for rotating the disk when the member moves in response to its bias but not when the member moves in the other direction, a wheel resting on said disks whereby rotation of either disk causes rotation of said wheel and the other disk, and a contact controlled jointly by said two members.

15. A track instrument comprising two operating members each pivotally mounted intermediate its ends, said members being biased to swing in opposite directions around the pivotal points, a track member located between said operating members on one side of said pivotal points whereby one member or the other is swung in opposition to its bias according as the rail rises or falls, means associated with said operating members on the other side of the pivotal points thereof for retarding the swing of each member in response to its bias, and a contact controlled jointly by said members.

In testimony whereof I affix my signature in presence of two witnesses.

CHARLES W. DUNHAM.

Witnesses:

A. HERMAN WEGNER,
E. P. CRUM.

Copies of this patent may be obtained for five cents each, by addressing the "Commissioner of Patents, Washington, D. C."